United States Patent
Arnold

(10) Patent No.: US 6,465,398 B1
(45) Date of Patent: Oct. 15, 2002

(54) LUBRICANT COMPOSITION FOR USE IN SNOW SLIDERS

(75) Inventor: Carl Bernard Arnold, Christiana, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/977,440

(22) Filed: Oct. 15, 2001

(51) Int. Cl.⁷ .................. C10M 111/04; A63C 5/00
(52) U.S. Cl. .................. 508/181; 508/451; 106/270; 106/271; 106/272; 280/601; 280/610
(58) Field of Search ........................................ 508/181

(56) References Cited

U.S. PATENT DOCUMENTS

| | | | | |
|---|---|---|---|---|
| 4,126,481 A | * | 11/1978 | Sampson et al. | ........... 106/191 |
| 4,343,863 A | * | 8/1982 | Lawrence et al. | .......... 106/270 |
| 4,529,826 A | | 7/1985 | Gambaretto | |
| 4,724,093 A | | 2/1988 | Gambaretto | |
| 4,923,624 A | * | 5/1990 | Albanesi | ..................... 106/271 |
| 5,114,482 A | * | 5/1992 | Hertel | ......................... 106/270 |
| 5,131,674 A | * | 7/1992 | Tokui et al. | ................. 280/610 |
| 5,202,041 A | | 4/1993 | Traverso et al. | |
| 5,344,580 A | * | 9/1994 | von Werner | ................. 106/270 |
| 5,423,994 A | | 6/1995 | Traverso et al. | |
| 5,466,743 A | * | 11/1995 | Schamesberger | ............ 524/462 |
| 5,571,779 A | | 11/1996 | Kleiner et al. | |
| 5,624,713 A | * | 4/1997 | Ramer | ......................... 427/371 |
| 5,914,298 A | * | 6/1999 | Karydas | ...................... 508/106 |
| 6,028,136 A | * | 2/2000 | Gambaretto | ................. 524/495 |
| 6,063,739 A | | 5/2000 | Geissbuhler | |
| 6,121,212 A | * | 9/2000 | Gambaretto | ................. 508/590 |

OTHER PUBLICATIONS

V. I. Aparin et al., "On the Ski–Snow Sliding Mechanism", Trenie i Iznos, vol. 11, No. 4, pp. 639–642, Allerton Press, Inc.

* cited by examiner

*Primary Examiner*—Ellen M. McAvoy

(57) ABSTRACT

The invention relates to improved compositions comprising paraffin waxes and fluoropoylmer micro powders, and to their uses in products and articles where reduced friction is desirable, such as snow slider equipment.

8 Claims, No Drawings

LUBRICANT COMPOSITION FOR USE IN SNOW SLIDERS

FIELD OF THE INVENTION

The invention relates to lubricant compositions made from a combination of paraffin waxes and fluoropoylmer micro powders, for use in snow slider equipment and other products and articles where reduced friction is desirable. When mixtures of this type are applied to snow slider surfaces the result is improved sliding and faster descent times under a variety of snow conditions.

TECHNICAL BACKGROUND

Skiing, sledding, snowmobiling and snow-boarding are popular sports in snow conditions. There is a need retain to kinetic energy and avoid friction loss in products such as skis and other snow sliding types of equipment to improve travel speed on a snowy or icy surfaces. While certain lubricant compositions have been made commercially available, these products may perform differently in colder snow condition temperatures than in warmer snow condition temperatures. This performance difference may affect snow sliding performance. Thus, different compositions may be required for different snow conditions.

Snow sliding equipment products that are used in snow conditions need to be able to avoid damage to the desirable sliding characteristics when in use. Skis require waxing or lubricating with waxes or lubricants to facilitate their sliding abilities. Ski and snowboard racing are determined by $100^{ths}$ of a second in descent times requiring exceptional and sometimes very expensive waxes tailored to specific snow conditions. Although there is much speculation, the process which forms the basis for sliding friction on snow and ice with snow sliders is not known in exact detail and is assumed to quite complex. This situation has given rise to a wide range of possibilities for improving snow slider lubricity, as well as a wide range of claims.

Friction phenomena related to snow slider equipment involves the formation of a liquid layer of water between the surfaces of melting snow and the slider equipment. Frictional heat that is generated at the interface between the snow slider surface and the snow crystals melts the local snow crystals. At higher temperatures, near or above the freezing point where melt water is present, and at higher speeds where there is sufficient heat generated to create melt water, snow and slider surfaces are partially separated by melt water leading to hydrodynamic lubrication. Melt water layers are found to be about 5 to 10 $\mu$m. The frictional heat that is associated with the motion of the snow sliding equipment causes more of the crystals to melt, creating more melt water. When additional melt water between the snow sliding equipment and the snow increases, it reduces the travel speed of the snow sliding equipment. This is an undesirable feature in snow sliding equipment. Friction heat increases with travel velocity, with waxes with high coefficients of friction, or from poor thermal conductivity of the ski base material. As a result, the locally formed melted water may extend over the entire running surface, which is thought to lead to an undesirable capillary or suction effect.

In colder snow conditions, the ice crystals do not melt as quickly as they would in warmer snow temperatures. The ice crystals tend to rub against the waxed surfaces that are commonly applied to snow sliding equipment, affecting the integrity of the snow slider surface and velocity capability of the equipment.

Polyethylene has been found to be a useful material for some snow sliding equipment. For example, polyethylene has been useful for ski sole materials due to its high resistance to oxidation and favorable mechanical properties, including elasticity modulus, high tensile strength, and high breaking load, which are all factors that increase with increasing molecular weight. However, polyethylene exhibits a surface energy of about 31 to about 33 nJm-2 (mJ-2 is equivalent to dynes/cm), and thus the use of wax coating on the snow slider equipment sole is recommended. Wax is used in order to eliminate the corrugations and irregularities on the sole surface, lower the surface tension of the ski sole surface, and provide a lubricant between the sole surface and the snow surface.

In general, ski waxes are composed predominately of linear paraffins which, because of their chemical structure, are partially soluble in the polyethylene ski bases. The impregnation capacity of the ski soles by the paraffin wax depends essentially on absorption exhibited due to the physical nature including porosity of the material. The coefficient of dynamic friction of polyethylene on snow is in the range of $\mu_k$=0.05–0.07. The coefficient of dynamic friction, $\mu_k$, of polyethylene on snow can be reduced slightly at velocities of 0 to 1 m/s when lubricated with paraffin waxes. With an increase in sliding speed, snow melting processes intensify and this increases the contact area and friction forces increase. See Aparin, V. I., Bezrukov, A. P., Dukhovskoi, E. A., On the Ski-Snow Sliding Mechanism, *Trenie I Iznos*, Vol. 11, No.4. pp. 639–642, 1990.

The lubricating properties of hydrocarbon ski waxes vary with snow temperature and moisture content. For maximum performance, waxes of increasing hardness are used as snow temperatures decrease. This is done to eliminate the shear to the coating on the snow sliding equipment described above.

Coatings of fluorinated materials are reported to exhibit surface tensions of about 16 to about 18 mJm-2 (dynes/cm), as opposed to about 28 to about 30 mJm-2 (dynes/cm) for normal paraffin wax. Discussions of the mechanisms for reductions of snow ski friction using these compounds surround the contact angle and the reduced wetting and therefore surface contact area for a fully wetted ski. In high humidity conditions fluorinated paraffins are added to or replace hydrocarbon waxes in wax formulations to reduce liquid water friction as taught in U.S. Pat. Nos. 4,724,093 and 5,202,041 (fluorinated ski waxes), U.S. Pat. Nos. 5,571,779, 6,028,136, and U.S. Pat. No. 6,063,739 (fluorinated waxes with graphite), U.S. Pat. No. 5,423,994, and U.S. Pat. No. 4,529,826. Perfluorinated waxes of these types, with melting points around 100° C., are available from various suppliers including Miteni of Italy and Hoechst Aktiengessellschaft of Germany.

Solid fluoropolymers having a melting point around 280° C., such as polytetraethylene (hereinafter referred to as "PTFE"), are not by themselves suitable for waxing skis. The melting points of PFTE materials are above those of polyethylene ski bases and most materials of ski construction. Therefore, the application of a solid fluoropolymer wax to the polyethylene snow sliding equipment is difficult to achieve.

Fluoropoylmers are not miscible in hydrocarbon waxes. However, fluoropolymer micro powders comprising agglomerates of average size of 200 $\mu$m, the agglomerates comprising loosely compacted particles of 0.1 $\mu$m average particle size can be suspended in solidified hydrocarbon or other waxes. This composition is applied by rubbing dry polyethylene snow sliding equipment surfaces, such as ski soles, against the composition to apply a thin, relatively uniform layer. Afterwards, and before use of the equipment, the surface may be polished to achieve smoothness. The composition is not expected to have a surface tension lower than the fluorinated materials used in known ski wax compositions. However the addition of particles with greater surface energies than the paraffin lowers the average surface tension of the compound.

Snow slider wax compositions that contain fluorinated materials are commercially available. Some contain blends of perfluoroalkylpolyether liquids that are not recommended for use in cold/dry snow conditions. Under such conditions the material becomes more viscous and the wax composition itself becomes sticky.

There is a need for a snow slider wax composition that is cost effective, performs well under a range of skiing snow conditions, can be easily manufactured, and has flexibility of application. The present invention provides for a wax composition comprising fluorinated micropowder that is useful as lubricating wax in snow slider products and meets the above conditions.

SUMMARY OF THE INVENTION

Disclosed is a composition consisting essentially of from about 10% by weight to about 90% by weight of at least one paraffin wax and from about 10% by weight to about 90% by weight of at least one fluoropolymer micropowder. A preferred embodiment has 10% to 50% by weight of the fluoropolymer micropowder. In a preferred embodiment, the composition has an average particle size of the fluoropolymer micropowder of about 0.2 $\mu$m or less. A hydrocarbon solvent, such as decane, can optionally be added to create a paste form of the composition.

Also disclosed is a method of using the above composition wherein said use comprises applying said composition to snow slider products.

DETAILED DESCRIPTION OF THE INVENTION

The present invention discloses a composition that is useful for snow slider products that performs well in a wide range of snow conditions (ie, warmer snow conditions and colder snow conditions). The composition can be used as a "rub-on" application or by a "hot wax" application.

The composition of the present invention comprises fluoropolymer micro powders that is loosely compacted to create a "fluff" type material, having agglomerate particle sizes of 200 $\mu$m and having an average particles size of 0.2 $\mu$m, and one or more paraffin wax(es) with different melt points to allow adaptation to different snow conditions. The composition is useful for reducing the sliding friction of snow sliders, and can be used in combination with other lubricating and friction-reducing compositions for snow slider equipment. A preferred embodiment contains 10% to 50% by weight of fluoropolymer material.

The present invention uses fluorinated micropowder compositions for snow slider products. The agglomerated particles break up into the primary particles having an average size of 0.2 $\mu$m upon exposure to abrasion from snow and ice at the running surface interface. The addition of the fluorinated micropowder reduces internal friction in the wax blend. It also provides dry friction lubrication. Particles of this size blend thoroughly with hydrocarbon waxes. These waxes are applied to snow sliders and may be applied by melting or rubbing against the snow slider surface. For skis, the composition would be applied to the ski sole.

"Rub-on" application may be accomplished using the composition in the form of a bar, or similar solid form, to rub the wax-based composition onto the snow slider equipment before use. The "hot-wax" application involves heating the composition to melt it (followed by ironing, smoothing or buffing). Once the composition is melted, the surface of the snow slider equipment that will be used to achieve velocity in snow is exposed to the melted composition. This can be done by dipping, brushing, or any similar method that will accomplish coating the relevant surface on the snow slider equipment. Once the exposed surface is coated, the melted composition is allowed to dry.

It is important to note that PFA melts at a high temperature (280° C.). Others have tried to use fluorinated materials that melt below 100° C. or at least below the melting temperature of polyethylene bases in order to get their materials onto skis. With the present fluorinated micropowder, a blend in the form of a hydrocarbon wax will easily melt below the melt temperature of the PE bases.

Surprisingly, compositions comprised of such heterogeneous mixtures of agglomerated micro powders and paraffin waxes show decreased static and dynamic friction when applied to ski surfaces. Evaluations of the compositions for performance show increased acceleration at the start of ski runs and better glide throughout the entire run.

Subjective tests comparing the gliding properties of waxes made with fluoropolymer micropowder blends note reduced friction or increased slipperiness at zero or low ski velocities. In addition top end speed appears to be increased.

EXAMPLES

Method for Measuring Dynamic/Static Surface Tensions and Dynamic/Static Contact Reported in Example 14

The Pendant Bubble Tensiometer/Video Goniometer is a versatile and accurate tool for measuring Dynamic/Static Surface Tensions and Dynamic/Static Contact Angles. It is very much more accurate for measuring Surface Tensions as compared to the conventional techniques such as the Wilhelmy plate method and the Du Nouy Ring method which rely on a single measurement. Similarly the Video Goniometer is more accurate as compared to the manually operated Goniometer as the chance for human error is reduced.

The apparatus consists of a system of lenses and pinholes used to align light from a source so as to obtain a parallel beam of light. This parallel beam passes through an event, in this case a drop on a surface. Light is blocked by the drop and passes through everywhere. Thus, the silhouette of the drop is focused onto the camera. The video signal is sent through a video timer to a computer via a cable where the images are captured/digitized by a frame grabber board (National Instruments 1407). The computer also controls a solenoid valve via a control box connected to the serial port which opens/closes depending on a signal. The liquid is supplied by a syringe pump (connected through the solenoid valve). Thus, through a command from the mouse(described later) a drop is formed on the sample surface and images captured immediately (thus starting at time zero). Processing of these images is carried out later to determine the surface tension.

The experimental procedure involves the following two basic steps:

(1) Forming a Drop (on Substrate) rapidly and simultaneously start acquiring images at previously specified time Intervals. This is accomplished by the LabVIEW program.

(2) The captured images are then analyzed using Scion Image OC,where the contact angles are measured. Using the angle tool, a line is drawn along the waxed surface, turning at the drop/surface interface, and up the side of the drop.

Samples were prepared by coating the surface of a 1"×1" square of Ultra-High Molecular Weight Polyethylene with wax using a hot iron, and then buffed with a clean, dry towel.

EXAMPLE 1

Perfluoroalkyl polymers, such as Teflon® PFA 9724, a loosely compacted fluff with agglomerated particle sizes of 200 $\mu$m having an average particle size of 0.2 $\mu$m are incorporated into molten paraffin waxes through mechanical mixing and allowed to cool. The mixture formed is a heterogeneous mixture of agglomerated particles suspended in solidified wax.

EXAMPLE 2

Approximately 175 grams of refined paraffin wax with a melting point range of 52–54° C. was raised to a temperature of 100° C. in a glass container suspended in a boiling water bath. The molten wax was agitated by an impeller driven by an electric motor. Approximately 17.5 grams (10% of the weight of the paraffin wax) of Teflon® PFA 9724 micro powder was slowly added in 5 gram increments. The mixture was agitated for 2 hours until the powder was completely incorporated. The mixture was poured into 50 gram PVC molds and cooled quickly in an ice water bath.

EXAMPLE 3

Approximately 175 grams of refined paraffin wax with a melting point range of 52–54° C. was raised to a temperature of 100° C. in a glass container suspended in a boiling water bath. The molten wax was agitated by an impeller driven by an electric motor. Approximately 43.8 grams (25% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 4

Approximately 175 grams of refined paraffin wax with a melting point range of 52–54° C. was raised to a temperature of 100° C. in a glass container suspended in a boiling water bath. The molten wax was agitated by an impeller driven by an electric motor. Approximately 87.5 grams (50% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 5

Approximately 175 grams of refined paraffin wax with a melting point range of 52–54° C. was raised to a temperature of 100C. in a glass container suspended in a boiling water bath. The molten wax was agitated by an impeller driven by an electric motor. Approximately 175 grams (100% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 6

Approximately 175 grams of refined paraffin wax with a melting point range of 56–58° C. was raised to a temperature of 100° C. in a glass container suspended in a boiling water bath. The molten wax was agitated by an impeller driven by an electric motor. Approximately 17.5 grams (10% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 7

Approximately 175 grams of refined paraffin wax with a melting point range of 56–58° C. was raised to a temperature of 100° C. in a glass container suspended in a boiling water bath. The molten wax was agitated by an impeller driven by an electric motor. Approximately 43.8 grams (25% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 8

Approximately 175 grams of refined paraffin wax with a melting point range of 56–58° C. was raised to a temperature of 100° C. in a glass container suspended in a boiling water bath. The molten wax was agitated by an impeller driven by an electric motor. Approximately 87.5 grams (50% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 9

Approximately 175 grams of refined paraffin wax with a melting point range of 56–58° C. was raised to a temperature of 100° C. in a glass container suspended in a boiling water bath. The molten wax was agitated by an impeller driven by an electric motor. Approximately 175 grams (100% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 10

Approximately 175 grams of refined paraffin wax with a melting point range of 58–60° C. was raised to a temperature of 100° C. in a glass container suspended in a boiling water bath. The molten wax was agitated by an impeller driven by an electric motor. Approximately 17.5 grams (10% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 11

Approximately 175 grams of refined paraffin wax with a melting point range of 58–60° C. was raised to a temperature of 100° C. in a glass container suspended in a boiling water bath. The molten wax was agitated by an impeller driven by an electric motor. Approximately 43.8 grams (25% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 12

Approximately 175 grams of refined paraffin wax with a melting point range of 58–60° C. was raised to a temperature of 100° C. in a glass container suspended in a boiling water bath. The molten wax was agitated by an impeller driven by an electric motor. Approximately 87.5 grams (50% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 13

Approximately 175 grams of refined paraffin wax with a melting point range of 58–60° C. was raised to a temperature of 100° C. in a glass container suspended in a boiling water bath. The molten wax was agitated by an impeller driven by an electric motor. Approximately 175 grams (100% of the weight of the paraffin wax) of Teflon® PFA 9724 micro powder was slowly added in 5 gram increments. The mixture was agitated for 2 hours until the powder was completely incorporated. The mixture was poured into 50 gram molds and cooled quickly in an ice water bath.

EXAMPLE 14

Static and dynamic contact angle (CA) measurements were conducted on various ski wax formulation, i.e, ones that are commercially available and applicants' experimental samples.

Materials Tested

| Commercial samples | From |
|---|---|
| Swix CH8 (hydrocarbon wax) | Swix, (Norway) |
| Swix CH10 (hydrocarbon wax) | Swix, (Norway) |
| Fluor GW25 (fluorinated wax) | Himenkol, (Germany) |
| Snow Champ SF 0/2 (fluorinated wax) | Himenkol, (Germany) |
| Swix HF6 (highly fluorinated wax)* | Swix (Norway) |

Zardoz Speedy Blue (hydrocarbon wax with high loading, <20%, of Krytox); from Zardox Products Inc., 3055 29th St. Boulder, Colo. 80301.

Invention Samples

P5 (Swix CH8 with a 50% loading of DuPont fluoro micro powder. The micro powder is Teflon® PFA 9724 ) Y5 (Swix CH10 with a 50% loading of DuPont fluoro micro powder. The micro powder is Teflon® PFA 9724)

Sample Preparation

All test samples were applied to 1"×1" blanks of UHMWPE, "hot wax", and polished.

UHMWPE =ultra high molecular weight polyethylene (the main base material used in skis/snowboards).

The "hot wax" and polish procedure was done according to well- established methods as described in the skiing literature.

Testing Measurements

A. Static Contact Angle Measurements

These measurements were conducted using a Rame-Hart Manual Contact Angle Goniometer. Samples were prepared in the same way as with the Dynamic Contact Angle Measurements.

Data generated from the static CA measurements:

| Test Material ("wax") | CA | Surface |
|---|---|---|
| P5 | 105 | 39.8 |
| Swix CH8 | 112 | 21.6 |
| Swix CH10 | 116 | 25.3 |
| Y5 | 107 | 21.6 |
| Swix HF6 | 112 | 19.6 |
| Snow Champ SF 0/2 | 118 | 24.4 |
| Fluor GW25 | 112 | 18.1 |
| Zardoz Speedy Blue | 118 | 22.8 |

Some observations with the Y5 and P5 test "ski wax" materials

The Invention test samples had much higher fluoro content (at 50% loadings) than the other samples, yet, the Invention test samples (Y5 and P5) had lower CA's, and performed equivalent to or better than the other commercial, fluoro-based ski wax products in terms of slipperiness/skier speed enhancement.

What is claimed is:

1. A composition consisting essentially of from about 10% by weight to about, 90% by weight of at least one paraffin wax and from about 10% by weight to about of 90% by weight of at least one perfluorinated tetrafluoroethylene polymer or copolymer micro powder.

2. The composition of claim 1 wherein the average particle size of the micro powder is about 0.2 μm or less.

3. The composition of claim 1 or claim 2 wherein a hydrocarbon solvent is added to said composition to create a paste form of said composition.

4. The composition of claim 3 wherein said solvent is decane.

5. The composition of claim 1 or claim 2 having a critical surface tension in excess of 15 mJm-2.

6. The composition of claim 1 or claim 2 wherein the composition has from about 10% by weight to about 50% by weight of the at least one micro powder.

7. A method of using the composition of claim 1, claim 2 or claim 3 comprising:

(I) applying said composition to a snow slider product.

8. The composition of claim 1 or claim 2 wherein the micropowder is a tetrafluoroethylene-perfluoro(propyl vinyl ether) copolymer micro powder.

* * * * *